United States Patent
Johnson, Sr. et al.

(10) Patent No.: US 11,512,808 B2
(45) Date of Patent: *Nov. 29, 2022

(54) DUAL CLAMPING DEVICE

(71) Applicant: Really Right Stuff, LLC, Lehi, UT (US)

(72) Inventors: Joseph M. Johnson, Sr., Lehi, UT (US); Verent Chan, Lehi, UT (US)

(73) Assignee: Really Right Stuff, LLC, Lehi, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/561,188

(22) Filed: Dec. 23, 2021

(65) Prior Publication Data

US 2022/0112978 A1    Apr. 14, 2022

Related U.S. Application Data

(63) Continuation of application No. 17/105,190, filed on Nov. 25, 2020, now Pat. No. 11,242,951, which is a continuation of application No. 16/731,569, filed on Dec. 31, 2019, now Pat. No. 10,883,650, which is a continuation of application No. 16/100,885, filed on Aug. 10, 2018, now Pat. No. 10,612,718.

(60) Provisional application No. 62/565,975, filed on Sep. 29, 2017.

(51) Int. Cl.
| | |
|---|---|
| *F16B 2/12* | (2006.01) |
| *F16M 11/16* | (2006.01) |
| *F16M 11/04* | (2006.01) |
| *F41G 11/00* | (2006.01) |

(52) U.S. Cl.
CPC ............ *F16M 11/16* (2013.01); *F16M 11/041* (2013.01); *F41G 11/00* (2013.01); *F16B 2/12* (2013.01)

(58) Field of Classification Search
USPC ............ 248/229.22, 229.24, 229.19, 229.14, 248/316.4, 316.6; 269/246, 43, 156
See application file for complete search history.

(56) References Cited

U.S. PATENT DOCUMENTS

| | | | |
|---|---|---|---|
| 2,459,676 | A | 1/1949 | Axtell |
| 5,941,489 | A | 8/1999 | Fanelli et al. |
| 6,135,435 | A | 10/2000 | Schmitz |
| 6,619,644 | B1 | 9/2003 | Liou |
| 6,655,069 | B2 | 12/2003 | Kim |
| 6,678,988 | B1 | 1/2004 | Poff, Jr. |
| 6,773,172 | B1 | 8/2004 | Johnson et al. |
| 6,854,206 | B2 | 2/2005 | Oz |
| 6,931,778 | B1 | 8/2005 | Nelson et al. |
| 7,272,904 | B2 | 9/2007 | Larue |
| 7,356,958 | B2 | 4/2008 | Weir |
| D594,083 | S | 6/2009 | Mayberry et al. |
| 7,975,419 | B2 | 7/2011 | Darian |
| D643,497 | S | 8/2011 | Fitzpatrick et al. |
| 8,091,265 | B1 | 1/2012 | Teetzel et al. |
| 8,336,247 | B2 | 12/2012 | Haering |
| 8,348,214 | B2 | 1/2013 | Vogt |

(Continued)

OTHER PUBLICATIONS

ARCA SWISS; "The ARCA-SWISS Monoballsystem" brochure; Oct. 8, 2012, 8 pages.

(Continued)

*Primary Examiner* — Alfred J Wujciak
(74) *Attorney, Agent, or Firm* — Chernoff, Vilhauer, McClung & Stenzel, LLP

(57) ABSTRACT

A dual clamping device.

5 Claims, 18 Drawing Sheets

(56) References Cited

U.S. PATENT DOCUMENTS

| | | |
|---|---|---|
| 8,398,037 B2 | 3/2013 | Johnson et al. |
| 8,413,362 B2 | 4/2013 | Houde-Walter |
| 9,298,069 B2 | 3/2016 | Johnson, Sr. |
| 9,562,550 B2 | 2/2017 | Swan et al. |
| 9,574,840 B1 | 2/2017 | Sisk |
| 9,618,302 B2 | 4/2017 | Kintzing |
| 10,612,718 B2 | 4/2020 | Johnson, Sr. |
| 10,883,650 B2 | 1/2021 | Johnson, Sr. |
| 2006/0175482 A1 | 8/2006 | Johnson |
| 2006/0177215 A1 | 8/2006 | Johnson |
| 2007/0180752 A1 | 8/2007 | Houde-Walter |
| 2012/0181406 A1 | 7/2012 | Ganzalez |
| 2014/0003862 A1 | 1/2014 | Shi |
| 2014/0245648 A1 | 9/2014 | Nierenberg |
| 2018/0259298 A1 | 9/2018 | Gao et al. |
| 2019/0128470 A1 | 5/2019 | Johnson, Sr. |
| 2020/0182397 A1 | 6/2020 | Johnson, Sr. |
| 2021/0156508 A1 | 5/2021 | Johnson, Sr. |

OTHER PUBLICATIONS amazon.com; sales advertisement for "Monstrum Tactical 1" Offset Picatinny Rail Mount for Flashlights; website site publication http://www.amazon.com/Monstrum-Tactical-Offset-Picatinny-Flashlights/dp/B00JQNCMJO?Ref_=ast_sto_dp; retrieved Jul. 20, 2020; 8 pages.

"Magpul RVG Vertical Foregrip—First Sale: Apr. 2010"; 5 pages.

DUAL CLAMPING DEVICE

CROSS-REFERENCE TO RELATED APPLICATIONS

This application is a continuation of U.S. patent application Ser. No. 17/105,190, filed Nov. 25, 2020, which is a continuation of U.S. patent application Ser. No. 16/731,569, filed Dec. 31, 2019, now U.S. Pat. No. 10,883,650, issued Jan. 5, 2021, which is a continuation of U.S. patent application Ser. No. 16/100,885, filed Aug. 10, 2018, now U.S. Pat. No. 10,612,718, issued Apr. 7, 2020, which claims the benefit of U.S. Provisional App. No. 62/565,975, filed Sep. 29, 2017, which are hereby incorporated by reference in their entirety.

BACKGROUND OF THE INVENTION

The present invention relates to a dual clamping device. More specifically, a dual clamping device that works in conjunction with commonly available dovetail brackets for imaging devices and commonly available accessory rails for rifles.

The Picatinny rail, also known as a MIL-STD-1913 rail, or Standardization Agreement 2324 rail, or also generally a NATO Accessory Rail referred to as STANAG 4694, is a bracket on some firearms that provides a mounting platform consisting of rails with multiple transverse slots. Referring to FIG. 1, the dimensions of the NATO Accessory Rail is illustrated. The Picatinny rail is designed to mount heavy sights and other attachments to the upper, side, or lower surfaces of all manner of weapons from crossbows to pistols and long arms up to and including anti-materiel rifles. The Picatinny rail consists of a strip undercut to form a flattened T cross-section provided with crosswise slots at intervals interspersed with flats that allow accessories to be slid into place from the end of the rail then locked in place; slid into the slots between raised flats then moved a short distance back or forth or clamped to the rail with bolts, and thumbscrews or levers. The Picatinny locking slot width is 0.206 in (5.23 mm). The spacing of slot centers is 0.394 in (10.01 mm) and the slot depth is 0.118 in (3.00 mm).

Referring to FIG. 2, FIG. 3, and FIG. 4 a NATO Picatinny Dovetail Adapter is illustrated. The adapter includes a body 100 with a clamp 110 that is movable with respect to the body 100. A set of three threaded screws 120, each of which may include a countersunk head 130, is rotatably interconnected with matching threads on the body 100. By rotation of the threaded screws 120, the clamp 110 is moved laterally with respect to the body 100. The body 100 defines a pair of dovetail groves 140 that fit arca-swiss style clamps.

Referring also to FIG. 5, the three screws 120 are loosened using a hex key until the jaw is fully opened. The body 100 is installed onto the rail 150 by aligning the screws with the slots in the rail. Each of the screws 120 are lightly tightened, and then further tightened using a torque wrench. Referring to FIG. 6, with the adapter securely affixed to the rail 150, a quick release clamp 160 may be detachably attached to the dovetail grooves 140 to support the firearm on a tripod.

Unfortunately, when the firearm is not being used with a compatible clamp, such as the arca-swiss compatible clamp, the shooter may desire to remove the adapter from the firearm which is a burdensome task. Also, the clamp that is detachably secured to the adapter tends to permit the firearm to slide within the clamp if not sufficiently secured.

The foregoing and other objectives, features, and advantages of the invention may be more readily understood upon consideration of the following detailed description of the invention, taken in conjunction with the accompanying drawings.

DETAILED DESCRIPTION OF PREFERRED EMBODIMENT

Figure 1:
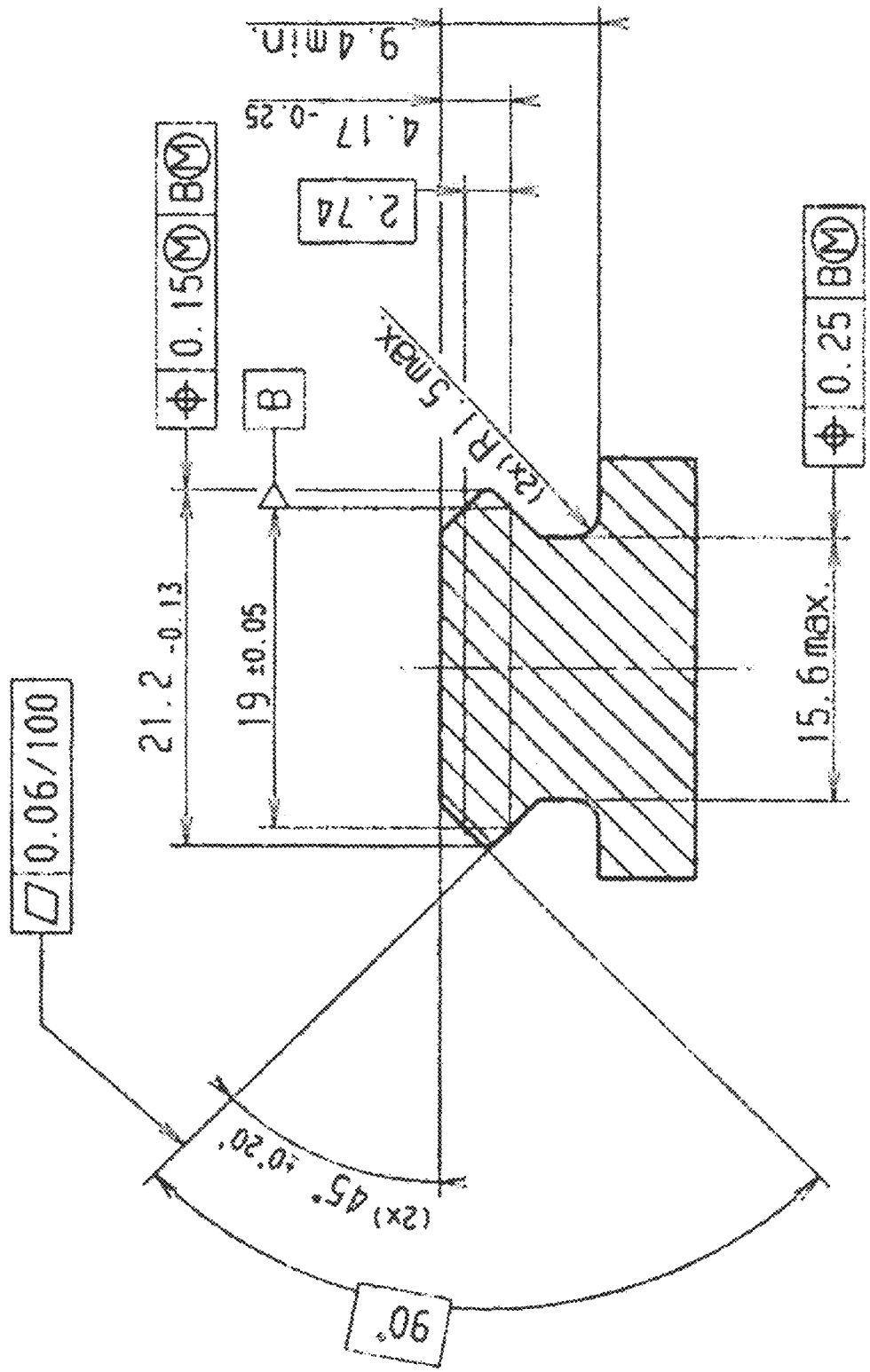
FIG. 1 illustrates a NATO Accessory Rail.
Figure 2:
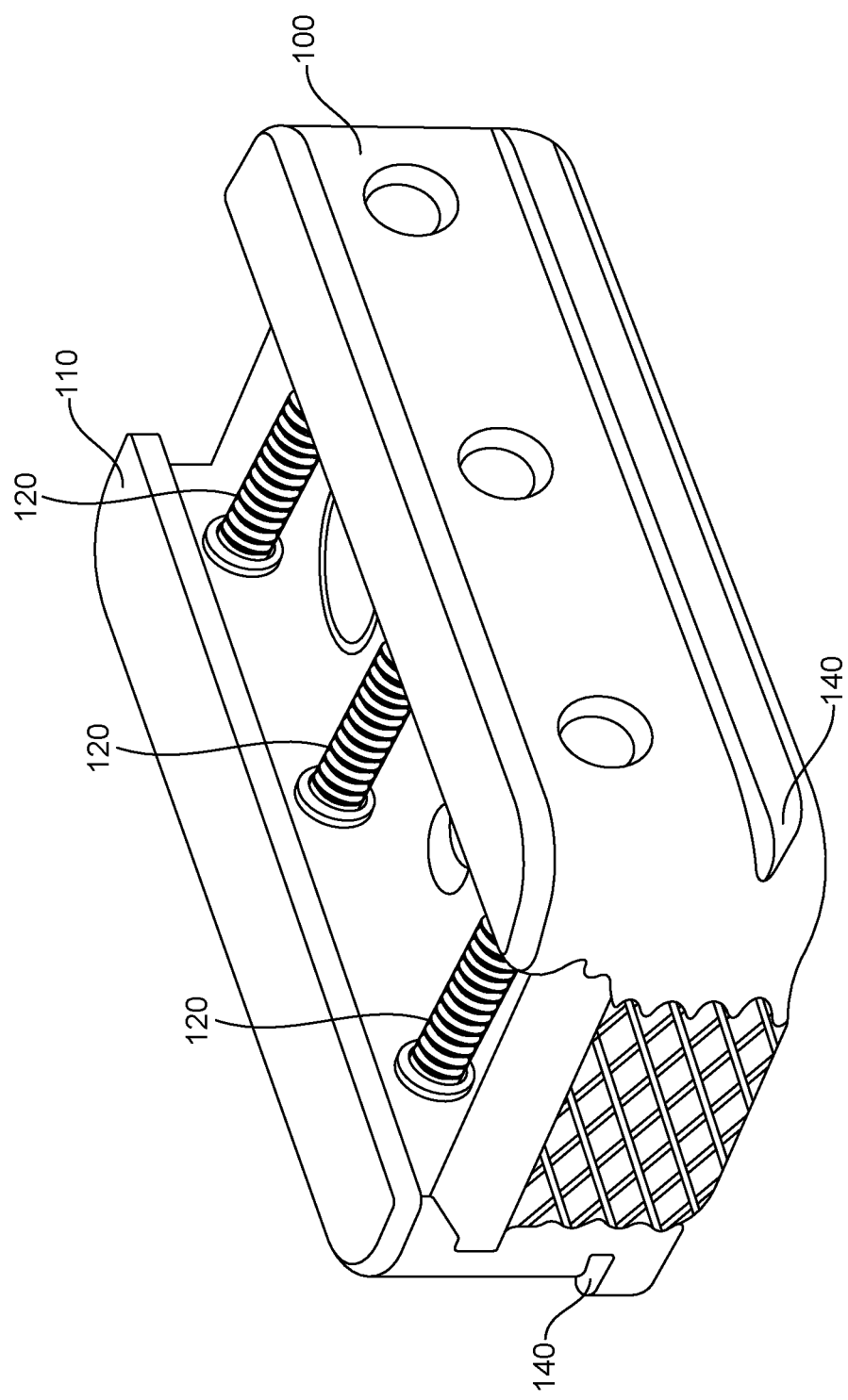
FIG. 2 illustrates a top perspective view of a NATO Picatinny Dovetail Adapter.
Figure 3:
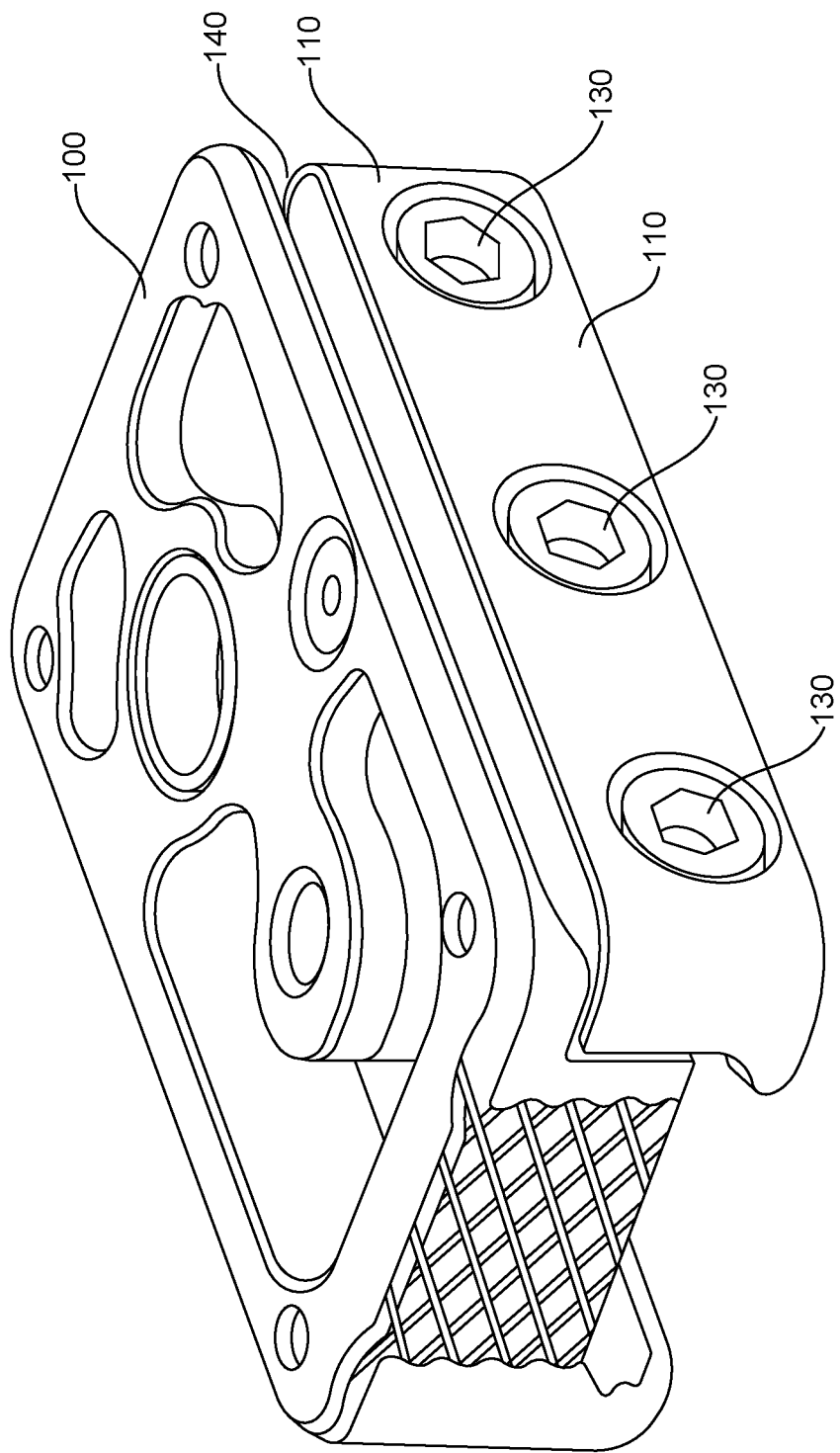
FIG. 3 illustrates a bottom perspective view of the NATO Picatinny Dovetail Adapter of FIG. 2.
Figure 4:
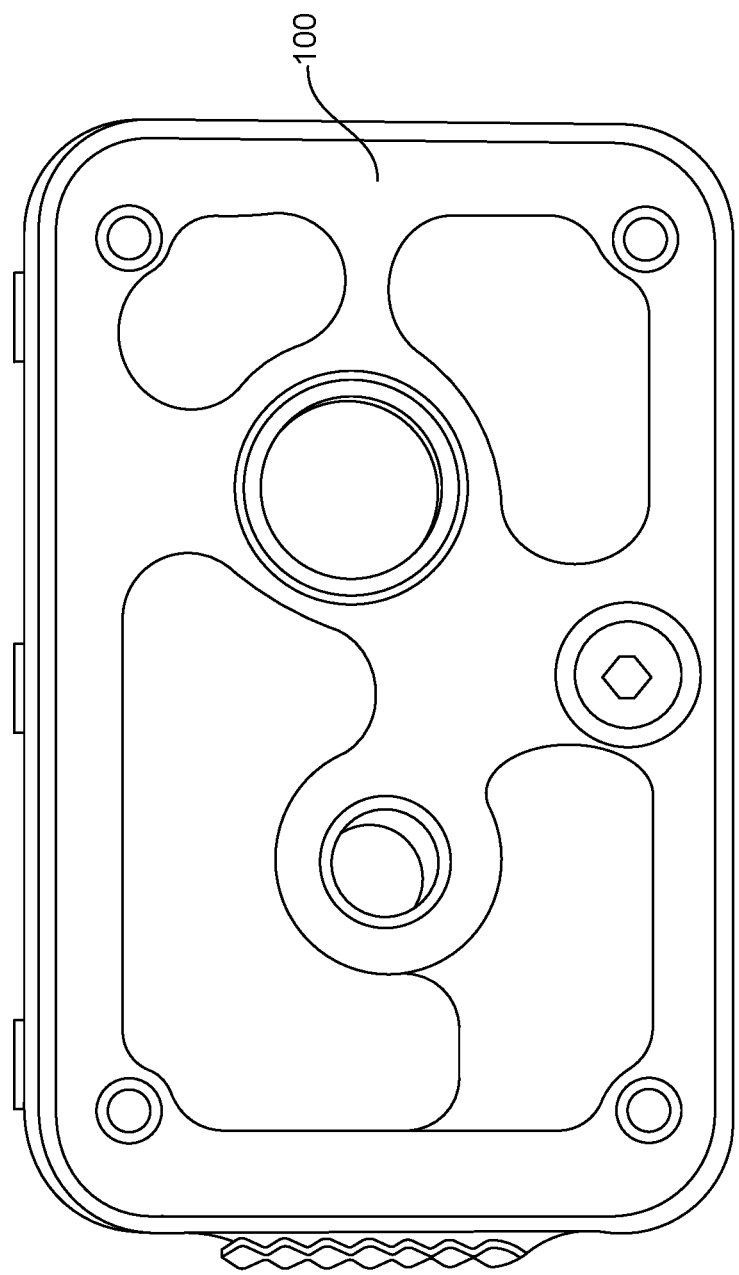
FIG. 4 illustrates a bottom view of the NATO Picatinny Dovetail Adapter of FIG. 2.
Figure 5:
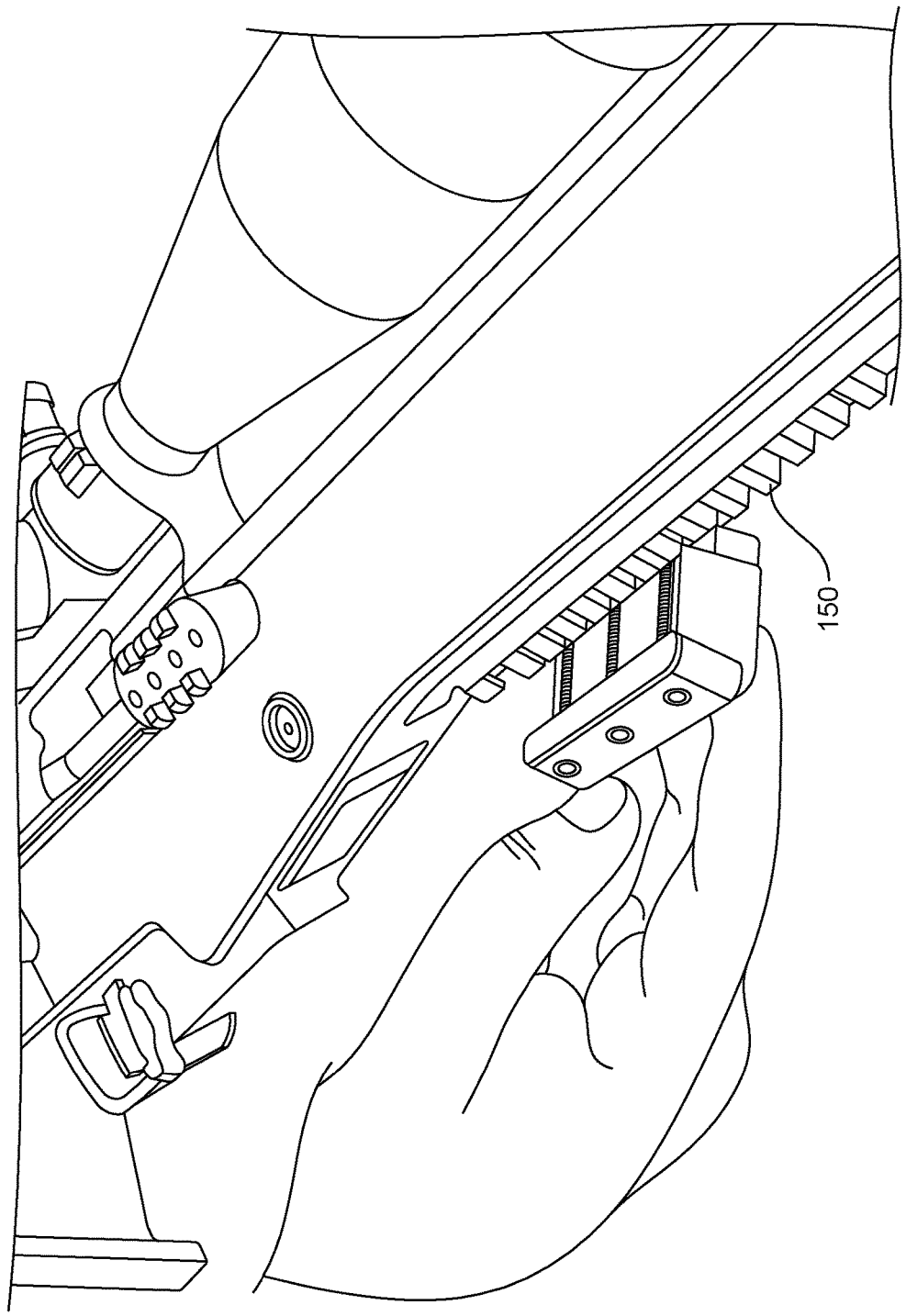
FIG. 5 illustrates the NATO Picatinny Dovetail Adapter of FIG. 2 being attached to a Picatinny rail.
Figure 6:
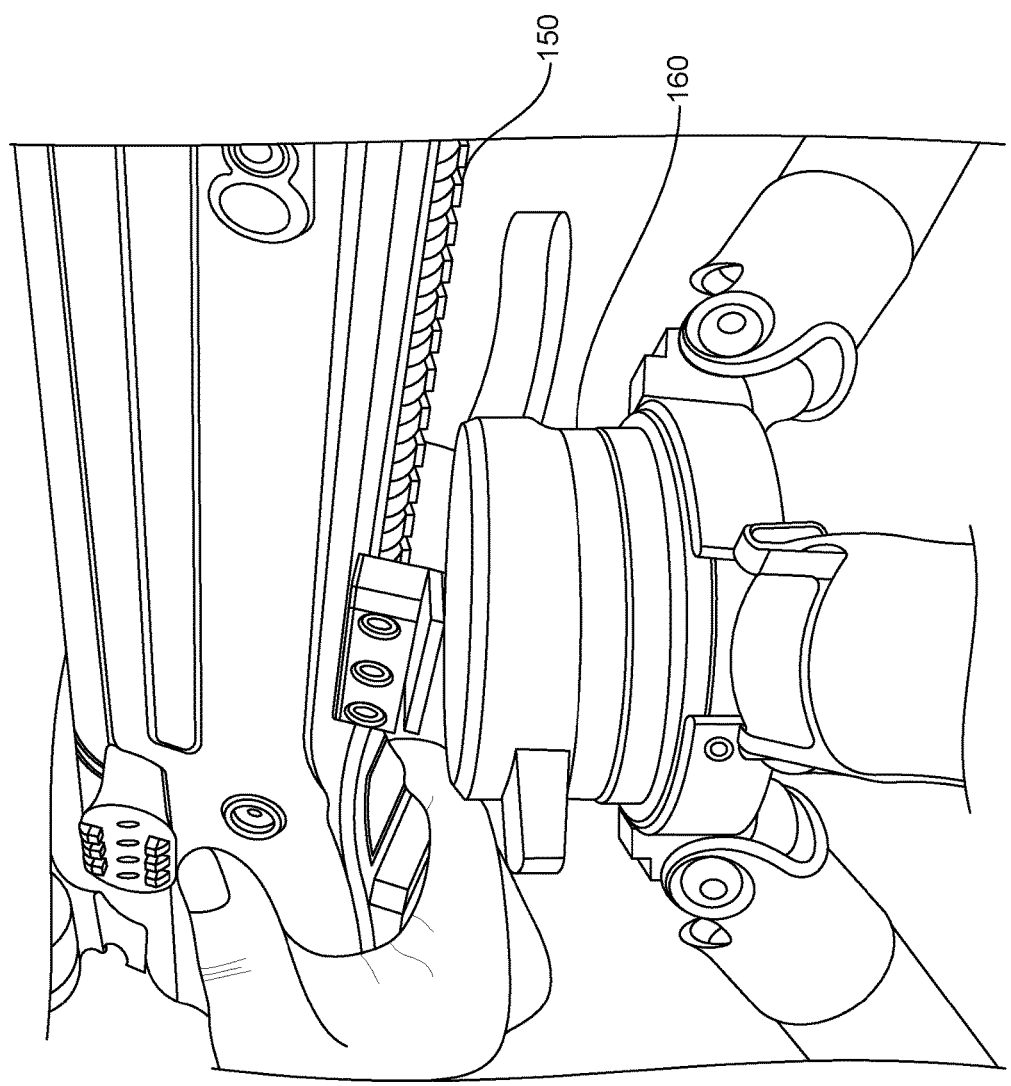
FIG. 6 illustrates the NATO Picatinny Dovetail Adapter of FIG. 2 attached to a Picatinny rail.
Figure 7:
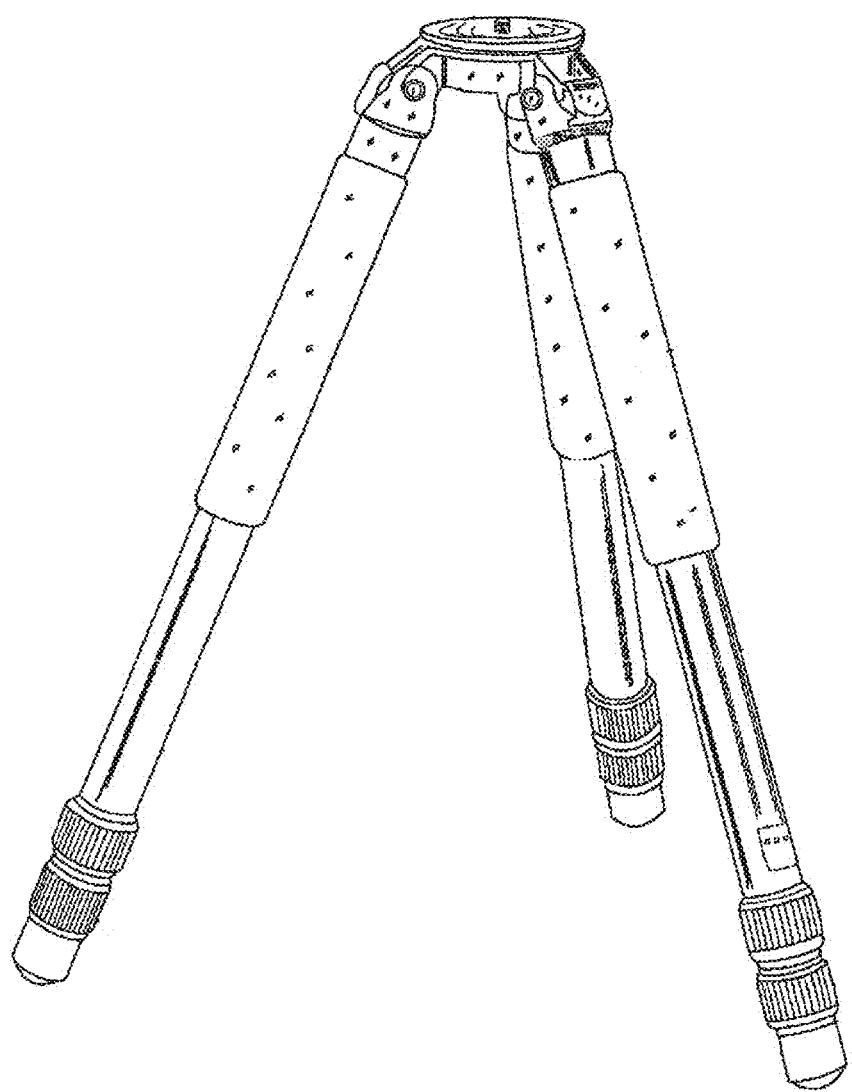
FIG. 7 illustrates a tripod.

Referring to FIG. 7, in many situations it is desirable to have a stable, yet portable, support to permit a shooter to reliably take long and extreme long distance shots (e.g., even beyond 1,000 yards). In many cases, it is desirable that the support is suitable for positioning a rifle of a shooter over two feet or more from the ground, preferably over three feet or more from the ground, and preferably at a height consistent with a standing position of the shooter from the ground. By positioning the support at an elevated height, the shooter is able to shoot over most obstacles without meaningfully compromising the stability of the system or otherwise meaningfully diminishing accuracy. One suitable type of support is a tripod that includes three legs, each of which may be moved inward and outward along an arc from an upper central region. In addition, each of the legs has an adjustable length so that the upper region may be leveled or otherwise oriented in any desired orientation. In addition, the upper region typically includes a threaded member, or otherwise, suitable to be attached to the base of an imaging device or a ball head. An exemplary tripod is illustrated in U.S. Pat. No. 8,398,037, incorporated by reference herein in its entirety. Other supports include, for example, a monopod or a bipod.

Figure 8:
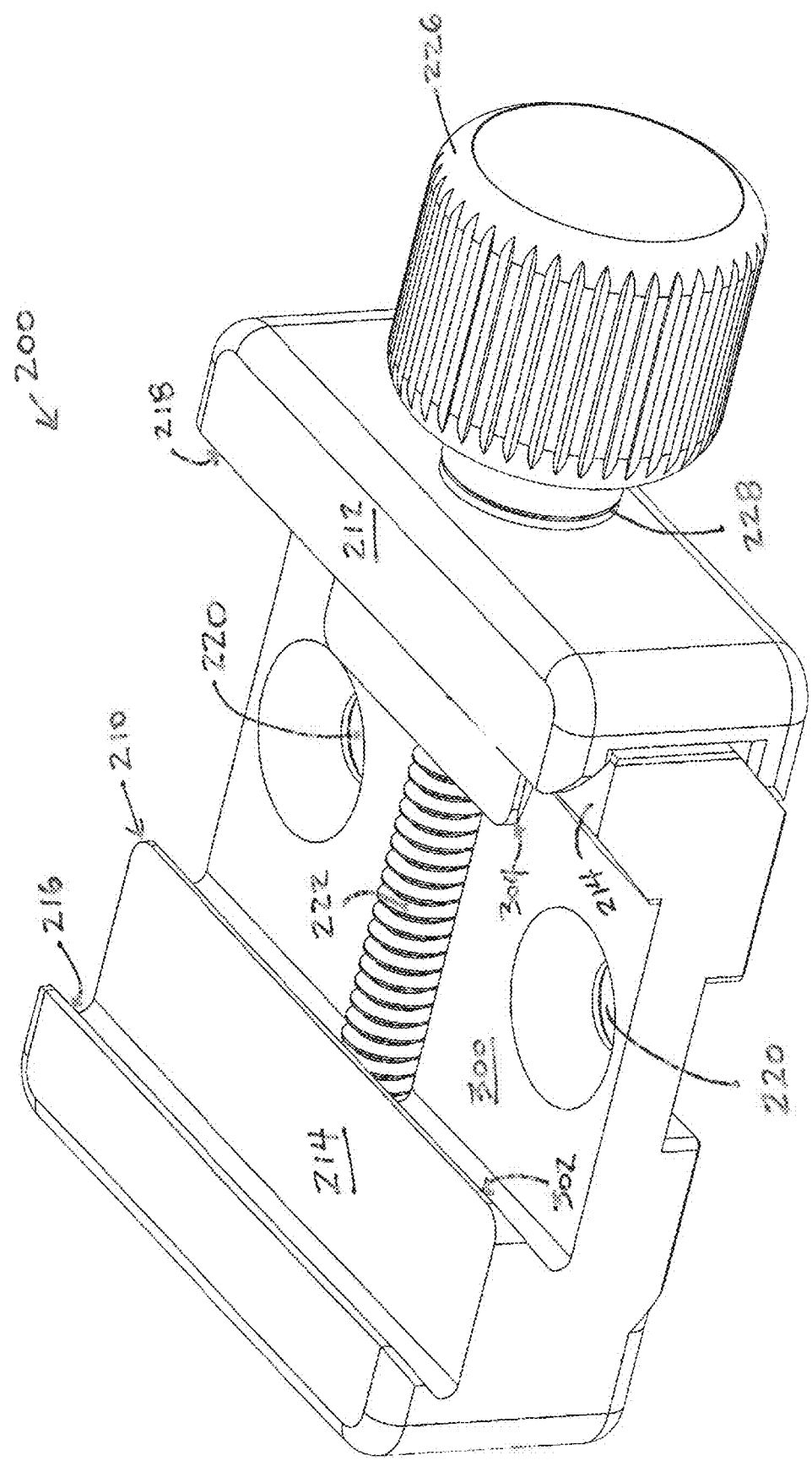
FIG. 8 illustrates an embodiment of a clamp assembly suitable to interconnect a dovetail plate of a camera and a Picatinny rail.
Figure 9:
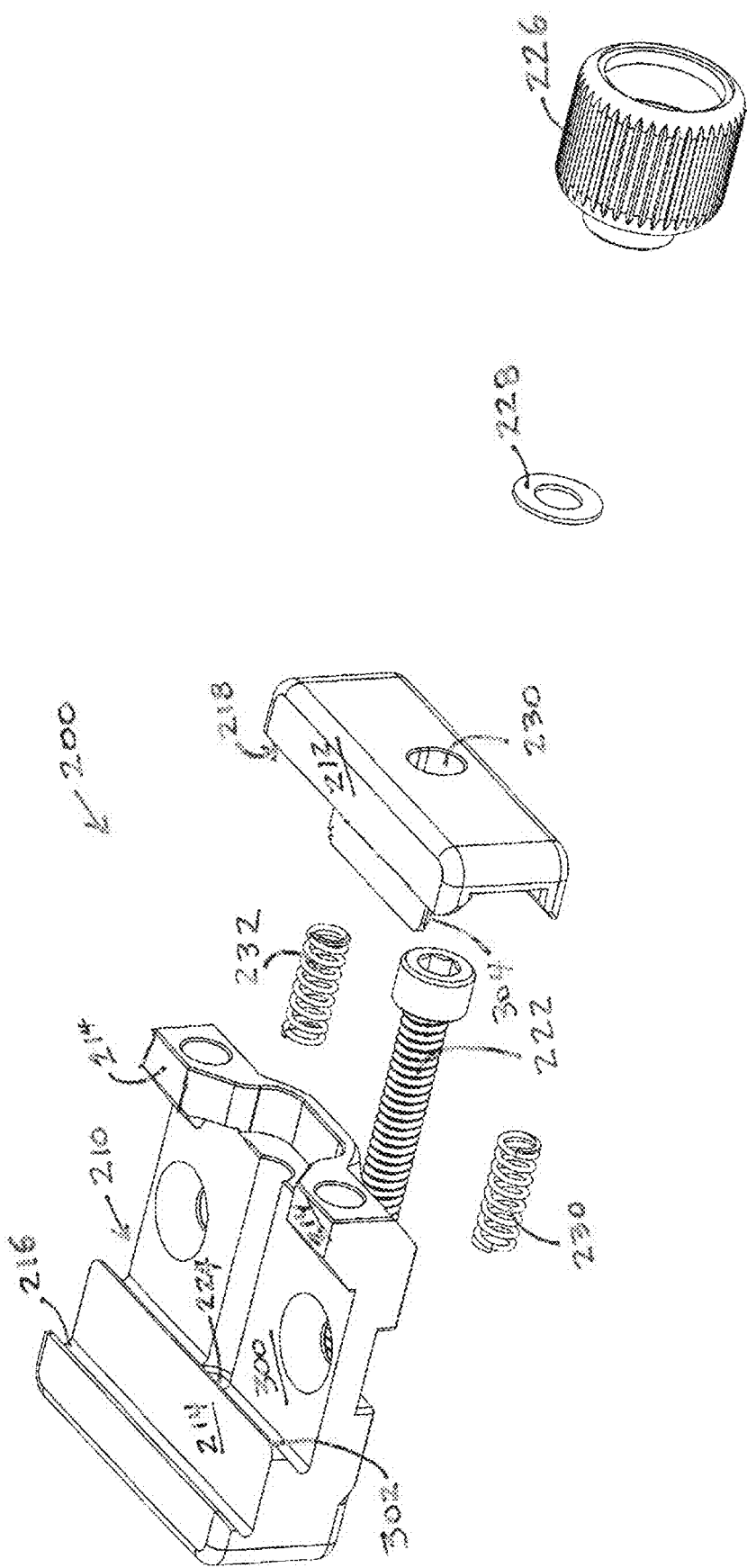
FIG. 9 illustrates an exploded view of clamp assembly of FIG. 8.
Figure 10:
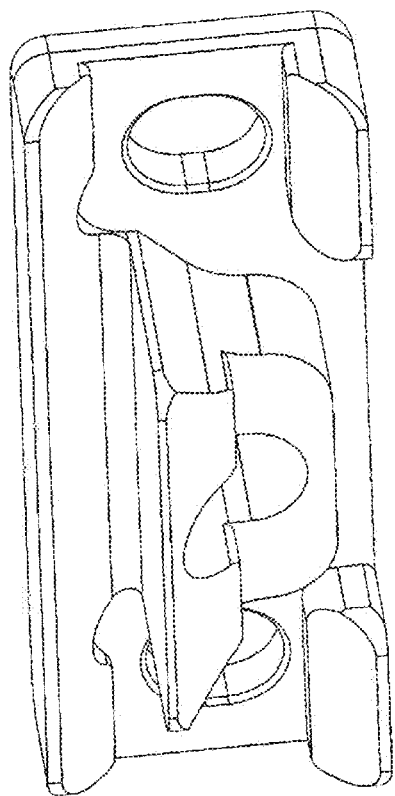
FIG. 10 illustrates an adjustment arm of the clamp assembly of FIG. 8.
Figure 11:
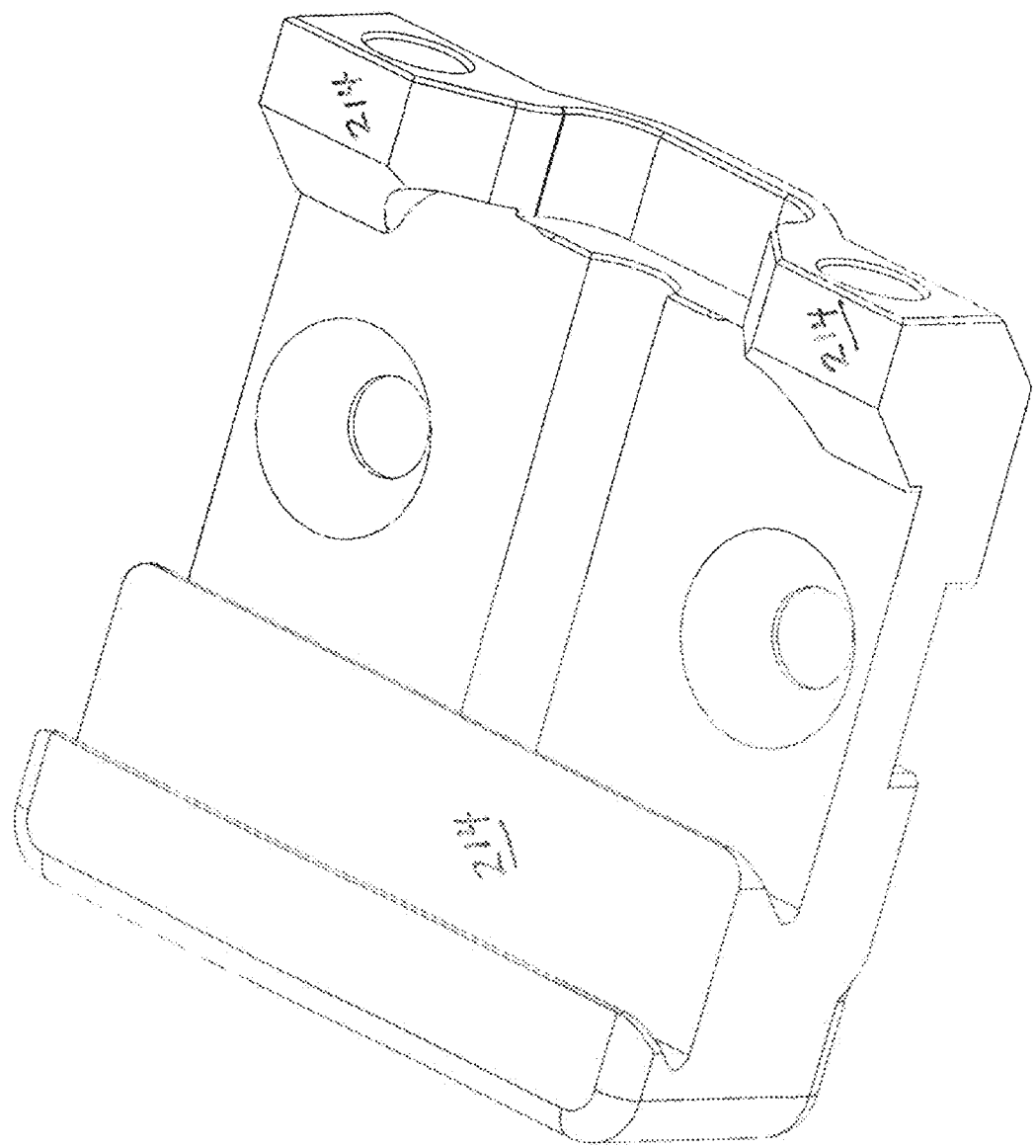
FIG. 11 illustrates a base of the clamp assembly of FIG. 8.
Figure 12:
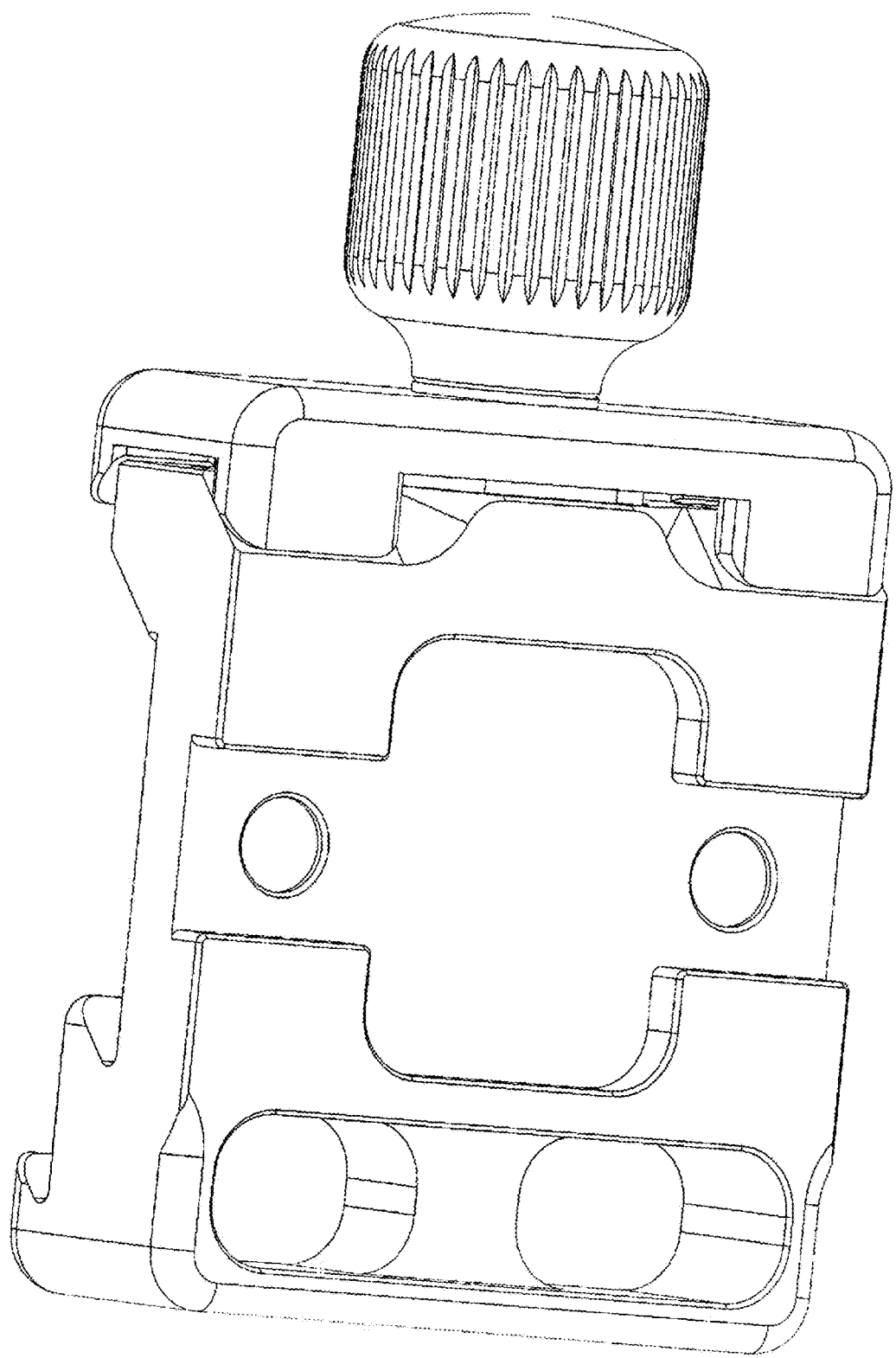
FIG. 12 illustrates a base view of the clamp assembly of FIG. 8.
Figure 13:
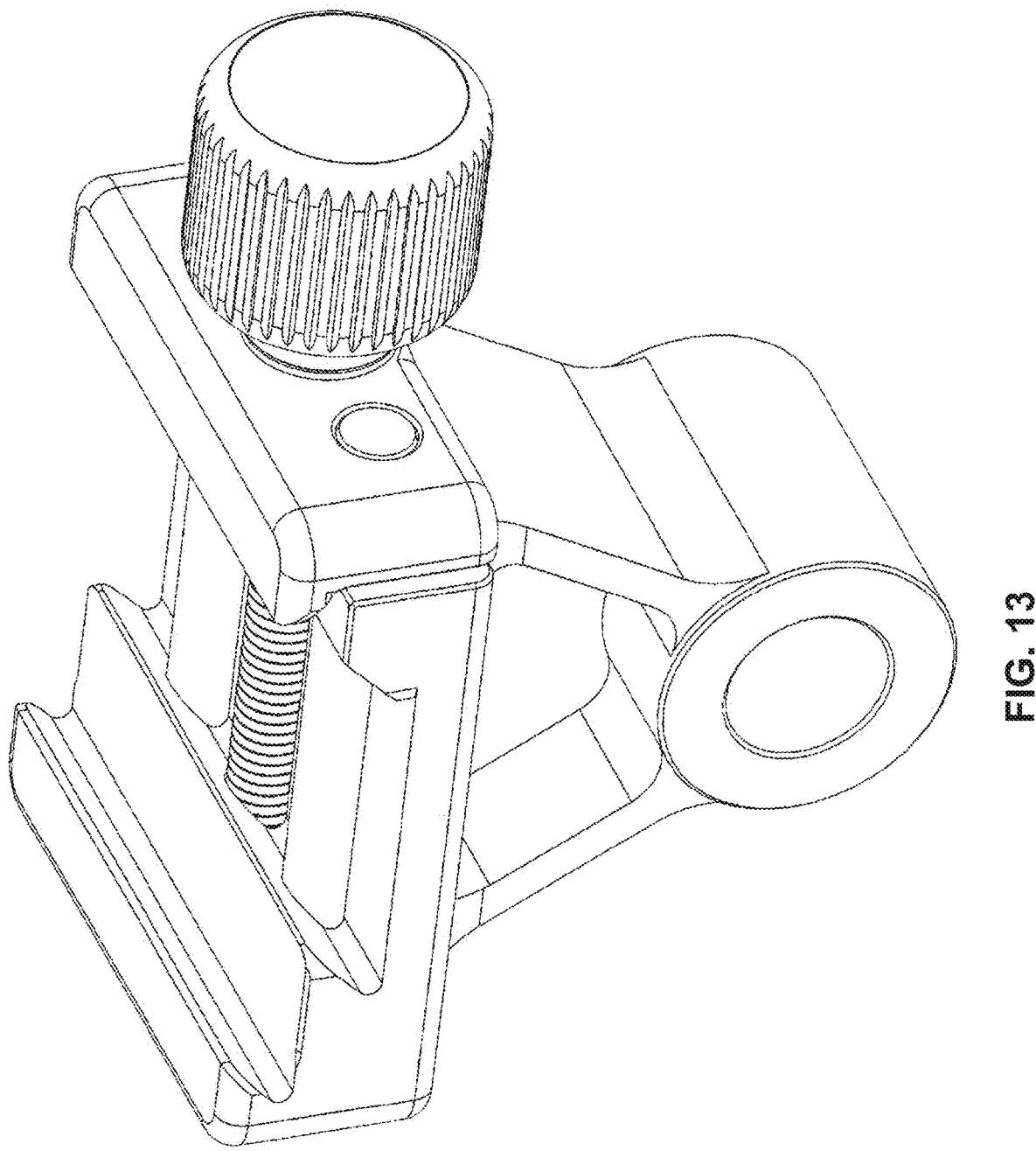
FIG. 13 illustrates another embodiment of a clamp assembly suitable to interconnect a dovetail plate of a camera and a Picatinny rail.
Figure 14:
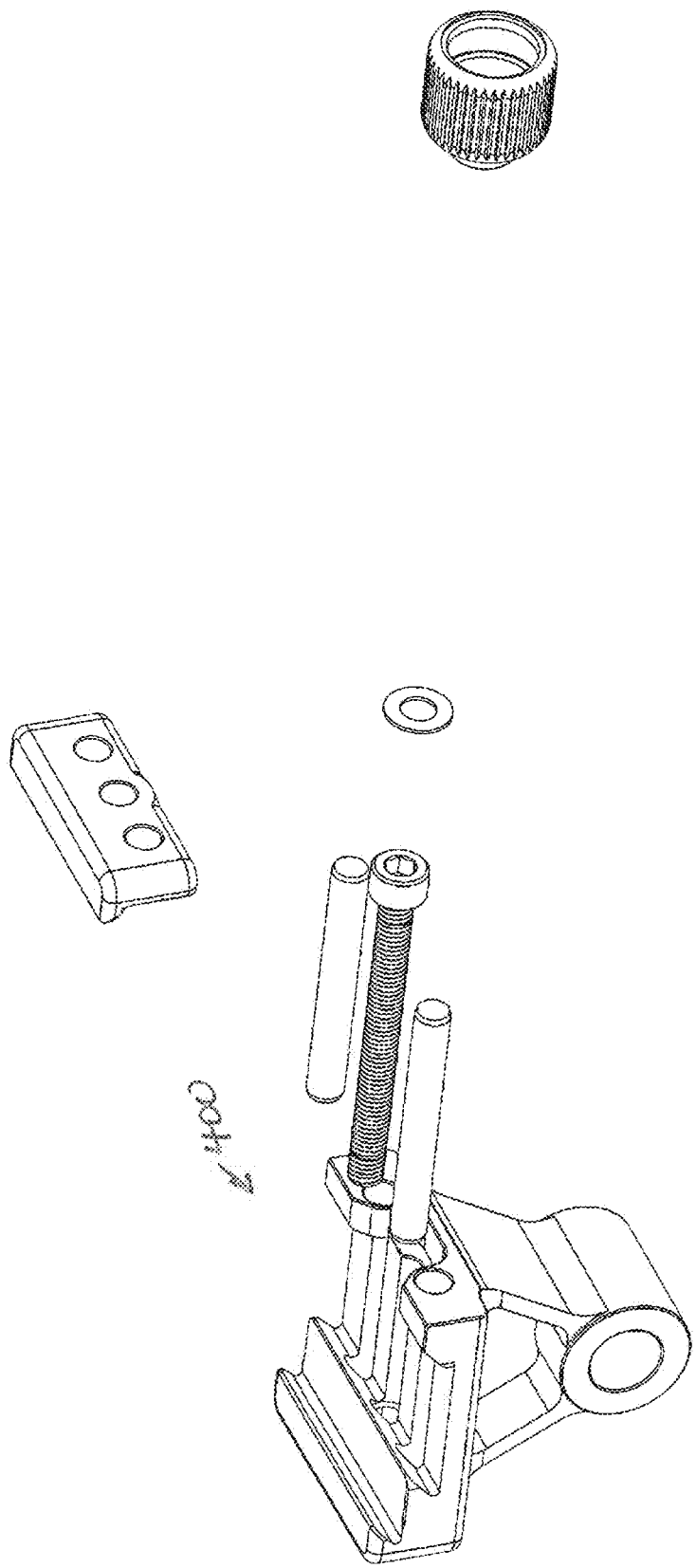
FIG. 14 illustrates an exploded view of clamp assembly of FIG. 12.
Figure 15:
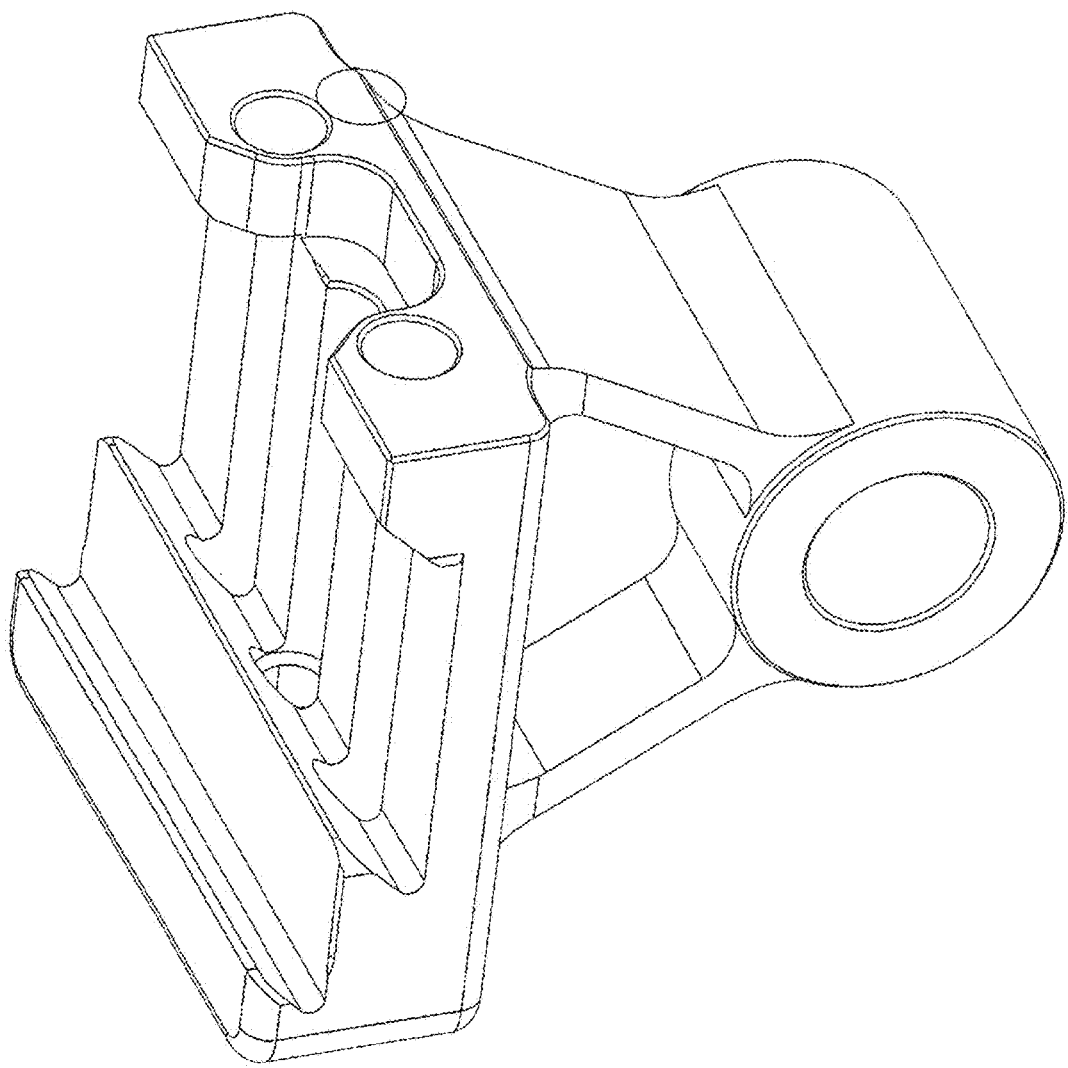
FIG. 15 illustrates a view of the base of the clamp assembly of FIG. 12.
Figure 16:
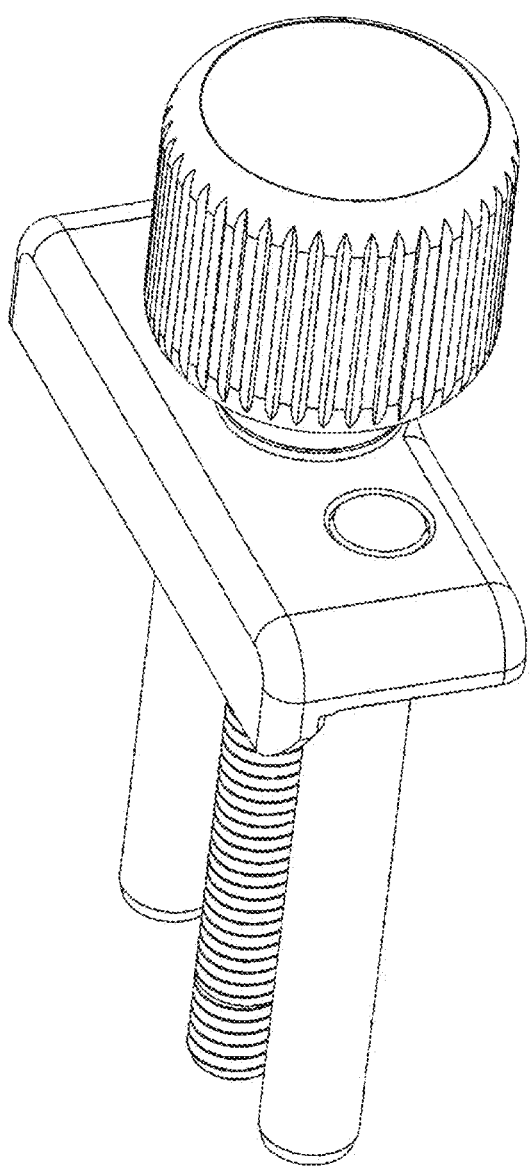
FIG. 16 illustrates a view of the adjustment arm of the clamp assembly of FIG. 12.
Figure 17:
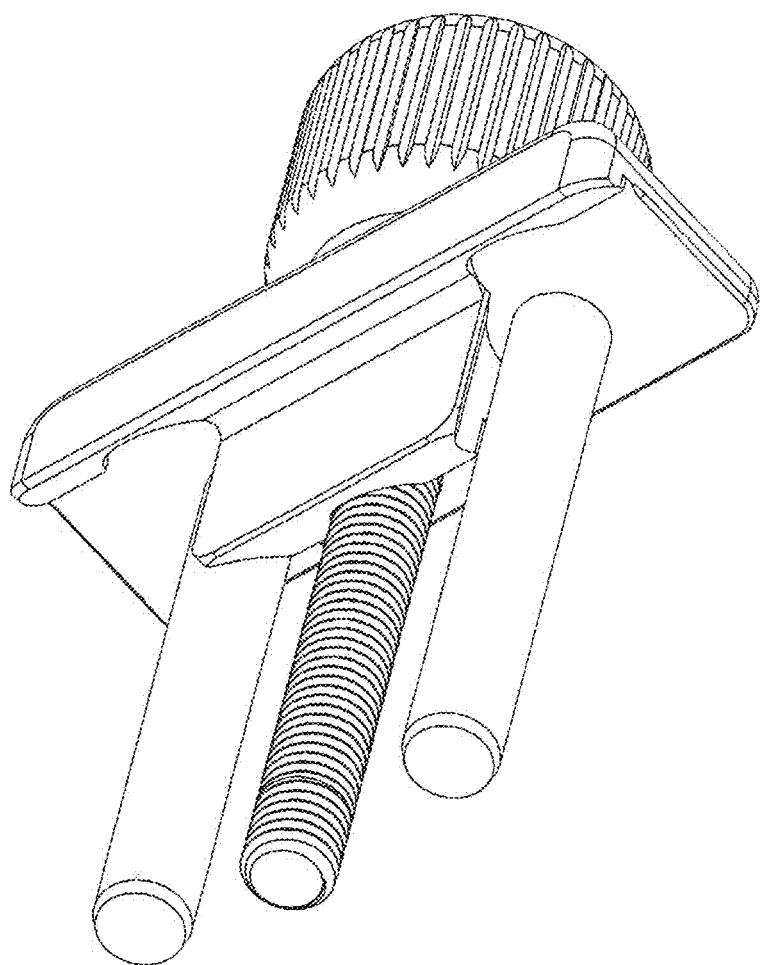
FIG. 17 illustrates another view of the adjustment arm of the clamp assembly of FIG. 12.
Figure 18:
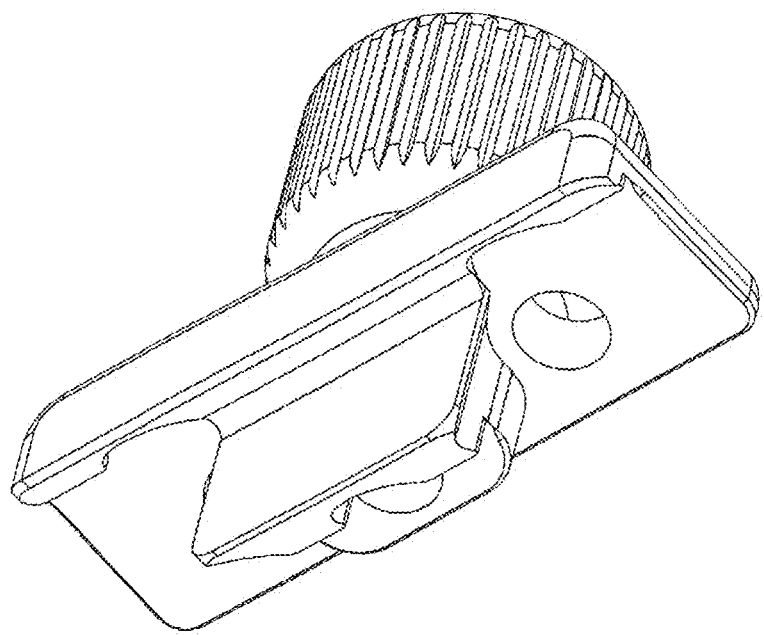
FIG. 18 illustrates another view of the adjustment arm of the clamp assembly of FIG. 12.

Referring to FIG. 8 and FIG. 9, a clamp assembly 200 is preferably detachably interconnected to a support or otherwise a ball head. The clamp assembly 200 includes a body 210 (see also FIG. 11) and an adjustable arm 212 (see also FIG. 10) that together form an upper channel 214 having upper opposed side walls 216 and 218. The upper channel 214 may include a pair of opposing supporting surfaces, one of which are part of the body 210 and/or the adjustable arm 212. Preferably, at least one of the supporting surfaces of the upper channel 214 extends less than half of the width of body 210 and is preferably substantially centered with respect to the adjustable arm 212. The body 210 may define a pair of openings 220 through which the clamp 200 may be secured to the upper portion of a tripod or other support. Referring also to FIG. 12, the base of the body 210 may include a tongue and groove interface to facilitate it to key the rotation of the clamp relative to a support, such as a ball head. Alternatively, the base of the body may include a planar surface suitable for a support having a flat upper surface. Alternatively, the base and/or the adjustable base may define a lower pair of dovetail grooves for attachment to a suitable clamp. The adjustable arm 212 is slidably engaged along a threaded stud 222 which is threadably secured to corresponding threads 224 in the body 210. The threaded stud 222 is secured to internal threads of a knob 226 together with a cap, together with a washer 228, and arranged through an external opening 230 in the adjustable arm 212. The end of the threaded stud 222 is threadably secured to the threads 224 in the body 210. Rotation of the knob 226 selectively adjusts the width of the upper channel 214 and is accomplished through manual operation of the knob 226 fastened to the distal end of the stud 222. Alternatively, the adjustable spacing may be achieved with any other suitable structure, such as a threaded fastener or a cam lever. By way of example, one exemplary cam lever is illustrated in U.S. Pat. No. 6,773,172, incorporated by reference herein in its entirety. By way of example, one exemplary ball head is illustrated in U.S. Patent Publication No. 2006/0175482, incorporated by reference herein in its entirety.

The knob 226, operably attached to the adjustable arm 212, permits adjustment of the spacing between the side walls 216 and 218 so that the upper channel may selectively either grip or release a pair of grooves attached to a camera body (not shown). An exemplary set of grooves attached to a camera body is illustrated in U.S. Pat. No. 9,298,069, incorporated by reference herein in its entirety. Each respective side wall 216 and 218 is preferably angled upward and inward to facilitate engagement with such grooves. In this manner, photographic equipment may be quickly engaged or released from the clamp assembly by using the upper channel.

A pair of springs 230 and 232 may be interconnected between the body 210 (preferably retained in a depression) and the adjustable arm 212 (preferably retained in a depression) so that an outwardly directed force is exerted between the body 210 and the adjustable arm 212 to assist in maintaining the adjustable arm 212 in a suitable position. Other structures may be included that operably tend to exert an outward force on the adjustment arm with respect to the body. By way of example, the upper channel 214 may define a minimum channel that is generally a maximum of about 41 millimeters wide at the inside of the channel, generally about a minimum of 34 millimeters wide at the top of the side walls 216 and 218, with a height of generally about 4 millimeters, and an angle of substantially 45 degrees. Other channel sizes and structures may be used to correspond with the desired support structure for an imaging device.

In many situations, it is desirable to remove the camera being used to capture images of a scene from the clamp assembly and support a firearm together with a scope thereon to obtain a sharpened view of the particular scene. In many cases, the firearm includes a Picatinny rail on the lower surface thereof. To facilitate interconnection of the clamp assembly to the Picatinny rail, the clamp assembly preferably includes a lower channel, at an elevation lower than the upper channel, suitable for detachably interconnecting with the Picatinny rail.

The clamp assembly 200 includes the body 210 and the adjustable arm 212 that together form a lower channel 300 having lower opposed side walls 302 and 304. The lower channel 300 may include a supporting surface which is primarily defined by the body 210 and a portion of which may be defined by the adjustable arm 212, if desired. Preferably, the supporting surface of the lower channel 300 extends the width of body 210. The adjustable arm 212 is slidably engaged along the threaded stud 222 which is threadably secured to the corresponding threads 224 in the body 210. Movement of the adjustable arm 212 selectively adjusts the width of the lower channel 300 and is accomplished through manual operation of rotating the knob 226 fastened to the distal end of the stud 222. The knob 226, attached to the adjustable arm 212, permits adjustment of the spacing between the side walls 302 and 304 so that the lower channel may selectively either grip or release one or more rails attached to the base of a firearm. Each respective side wall 302 and 304 includes a portion of which is preferably angled upward and inward to facilitate engagement with such rails. The lower channel 300 also preferably defines a raised central portion, which may be defined by the stud 222, which preferably has a width suitable to be positioned between a pair of rails of the Picatinny rail. In this manner, the raised central portion will tend to inhibit the clamp sliding with respect to the Picatinny rail because the raised central portion will come into contact with one of the rails of the Picatinny rail. Preferably the adjustment mechanism is achieved using a centered shaft, but may alternatively be more than one centered shafts and/or one or more off-centered shafts. Preferably, the shaft occupies the same region of space as the Picatinny clamp. Alternatively, the shaft may be positioned beneath the lower channel, if desired. As described, the shaft which is part of the adjustment arm adjustment mechanism may be used to engage the grooves of the Picatinny clamp to prevent shifting of the clamp under loaded conditions. Alternatively, other structures may be used for engagement with the grooves of the Picatinny clamp, such as one or more pins or protruding features. In this manner, firearms may be quickly engaged or released from the clamp assembly by using the lower channel.

As previously described, the clamp assembly 200 with a "stationary" body together with a moving adjustment arm defines the upper clamp that is preferably compatible with Really Right Stuff™ and Arca-Swiss style dovetails. As previously described, the clamp assembly 200 with a "stationary" body together with a moving adjustment arm defines the lower clamp that is preferably compatible with the Picatinny rail. With separate structures at different elevations within the same clamp assembly facilitates a compact clamp assembly that defines a pair of adjustable spacing structures.

Referring to FIGS. 13-18, another embodiment includes a clamp head 400 with a supporting structure suitable for a Harris style clamp for being attached to a Harris bipod.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. An apparatus for selectively engaging a plate for photographic equipment and a Picatinny rail assembly for a firearm, said apparatus comprising:
   (a) a body defining a portion of an upper channel having a first side wall;
   (b) an arm defining a portion of said upper channel having a second side wall capable of lateral movement with respect to said first side wall suitable to detachably engage a pair of inclined surfaces of said plate;
   (c) said body defining a portion of a lower channel having a third side wall;
   (d) said arm defining a portion of said lower channel having a fourth side wall capable of lateral movement with respect to said third side wall suitable to detachably engage a rail of said Picatinny rail assembly;
   (e) wherein said upper channel is at a higher elevation than said lower channel;
   (f) said body defining a lower surface between said third side wall and said fourth side wall;
   (g) said arm is slidably engaged with said body;
   (h) a plurality of elongate members extending along at least a portion of said body, where said plurality of elongate members are parallel to one another, where each of said plurality of elongate members is at a location at least partially directly above a plane defined by said lower surface of said body;
   (i) wherein the spacing between a central axis of each said plurality of elongate members is aligned on spaced apart substantially 10 mm centers in such a manner that said plurality of elongate members is suitable to engage a plurality of slots of said Picatinny rail assembly aligned on spaced apart substantially 10 mm centers for said firearm.

2. The apparatus of claim 1 wherein said plurality of elongate members form a set of grooves defined between respective pairs of said plurality of elongate members.

3. The apparatus of claim 2 wherein a lower portion of each of said grooves is said lower surface.

4. The apparatus of claim 3 wherein an upper portion of each of said grooves is a respective one of said plurality of elongate members.

5. The apparatus of claim 4 wherein each of said plurality of elongate members is movable with respect to said body.

* * * * *